(No Model.)
C. L. AMES.
TIRE FOR WHEELS.
No. 517,415. Patented Mar. 27, 1894.
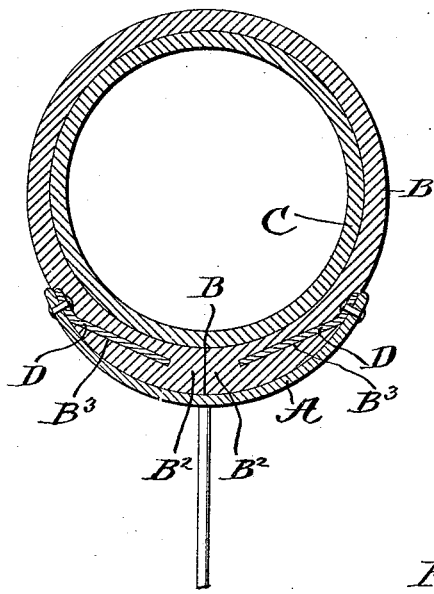
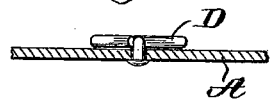
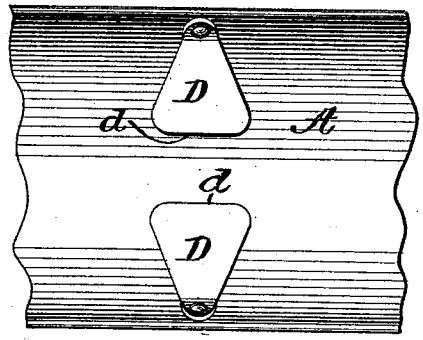
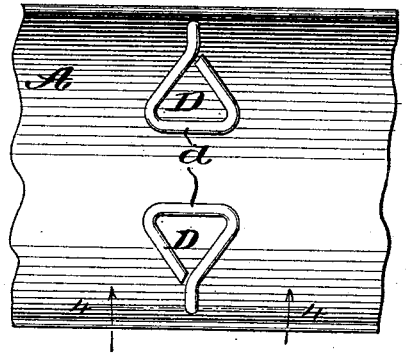
Witnesses
Inventor
Charles L. Ames
by Cyrus Kehr Att'y

UNITED STATES PATENT OFFICE.

CHARLES L. AMES, OF RIDGELAND, ILLINOIS.

TIRE FOR WHEELS.

SPECIFICATION forming part of Letters Patent No. 517,415, dated March 27, 1894.

Application filed July 6, 1893. Serial No. 479,692. (No model.)

*To all whom it may concern:*

Be it known that I, CHARLES L. AMES, a citizen of the United States, residing at Ridgeland, in the county of Cook and State of Illinois, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This improvement relates particularly to wheels having pneumatic or similar tires in which the outer covering is open along a line extending along the middle of the seat or portion which rests in the rim of the wheel. The object of the invention is to produce such a tire provided with efficient and convenient means for holding its edges together along said opening, the tire being at the same time of proper shape along the seat to fit into a rim which is concave in cross-section.

In the accompanying drawings: Figure 1 is a transverse section of a tire and rim embodying my improvement. Figs. 2, 3, and 4 are detail views of portions of the rim.

In said drawings, A, is the rim.

B is the outer tube of the tire, and C is the inner tube of the tire. Said tube, C, is to be air tight and may be of any well known form. The tube, B, is of relatively strong construction, as is usual with the construction of this tube.

Along a line extending along the middle of the seat or portion lying in the rim, A, the tube, B, is open, as indicated at B', all around the tire, in order that the tube, C, may be readily inserted and removed and in order that access may be had to said tube, C, at any point of the circumference of the tire. The edges, B², of the tube, B, along said opening are so fitted as to adapt them to meet closely and make a tight joint when pressed together. The interior of the tube, B, is preferably circular in cross-section, in order that the tube, C, may be of this form when inflated. The exterior of the tube, B, outside of the portion which is to rest in the rim, A, may be of any desired form. Along a line parallel and adjacent to the line to be occupied by the edge of the rim, said tube is gradually thickened to the middle of the seat or portion which is to rest in the rim, A. Thus said seat is curved in cross-section upon a radius approximately equal to the radius of the main portion of the tube, B, but having its center a little nearer the seat than the center of the interior of the tube, B, and is adapted to fit into a rim which is concave on a corresponding radius.

D, D, are binders extending into the slots, B³, and having their outer ends pivoted to the rim, A, at or adjacent to the edges of the latter, on axes which are substantially perpendicular to the plane of said binders. Said binders are preferably arranged in pairs along the opposite edges of the rim. The binders shown in Figs. 1 and 2 are made of sheet metal.

Before securing the tire to the rim, all the binders have their free ends swung outward away from the rim, as indicated by the dotted line in Fig. 2. This leaves the concave side of the rim clear to receive the seat of the tube, B. After placing the tube, C, into the tube, B, the latter is put into place upon the rim, A. The binders, D, are then swung inward on their pivots until they lie transversely to the rim, and in the adjacent slot, B³. Said binders should be of such length as to cause the free ends to press against the web between the inner portion of the slot, B³, and the openings B'. Thus these binders will press the edges, B², against each other and into the concave portion of the rim, A. When it is desired to remove or have access to the inner tube of the tire, any or all of the fasteners may be swung upon their pivots out of the slot, B³, until there is no engagement between said binders and the tube, B.

In Figs. 3 and 4, the binders are made of wire, the wire being bent to form the body of the binder and one end being turned out of the plane of said body to form a shank extending through the rim to form the pivot. The free end of the binders should be expanded to form a relatively straight edge, d, at right angles to the length of the fastener, in order that said end may become the better seated against the web between the slot, B³, and the opening, B'.

I claim as my invention—

1. The combination with the tube, B, open along a line extending along the middle of the seat and having lateral slots, B³, of a rim and binders pivoted to said rim by one end and having the other end adapted to extend into said lateral slots, substantially as described.

2. The combination with the tube, B, open along a line extending along the middle of the seat and having lateral slots, B³, of a rim and binders secured by one end to the edge of the rim by pivots which are perpendicular to the adjacent portion of the rim, and the other end of said binders extending into said lateral slots, substantially as described.

3. The combination with the tube, B, open along a line extending along the middle of the seat and having lateral slots, B³, of a rim and sheet metal binders pivoted to said rim by one end and having the other end extending into said lateral slots, substantially as described.

4. The combination with the tube, B, open along a line extending along the middle of the seat and having lateral slots, B³, of a rim and binders pivoted to said rim by one end and having the other end provided with a relatively straight edge at right angles to the length of the fasteners and adapted to extend into said lateral slots, substantially as described.

In testimony whereof I affix my signature, in presence of two witnesses, this 26th day of June, in the year 1893.

CHARLES L. AMES.

Witnesses:
CYRUS KEHR,
AMBROSE RISDON.